United States Patent

Sugimoto et al.

[11] 3,925,362
[45] Dec. 9, 1975

[54] α-ALKYLSULFOBENZYL PENICILLINS AND PRODUCTION THEREOF

[75] Inventors: Keiichi Sugimoto, Kawanishi; Kouji Nishijima; Nobuharu Kakeya, both of Takatsuki, all of Japan

[73] Assignee: Takeda Chemical Industries, Ltd., Osaka, Japan

[22] Filed: Apr. 24, 1973

[21] Appl. No.: 354,140

[30] Foreign Application Priority Data
May 22, 1972 Japan............................ 47-50998

[52] U.S. Cl............................. 260/239.1; 424/271
[51] Int. Cl.²................................ C07D 499/44
[58] Field of Search........................ 260/239.1

[56] References Cited
UNITED STATES PATENTS
3,660,379  5/1972  Morimoto et al............ 260/239.1

*Primary Examiner*—Nicholas S. Rizzo
*Attorney, Agent, or Firm*—Wenderoth, Lind & Ponack

[57] ABSTRACT

Novel penicillins shown by the general formula:

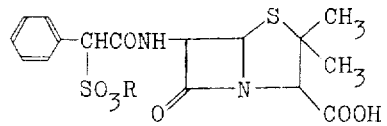

(wherein R is a straight alkyl group of not less than 7 carbon atoms) and their pharmaceutically acceptable salts are easily absorbed in blood and tissues through oral administration and show excellent antimicrobial activity against Gram-positive and Gram-negative bacteria, particularly against microorganisms of the genus *Pseudomonas aeruginosa*.

6 Claims, No Drawings

α-ALKYLSULFOBENZYL PENICILLINS AND PRODUCTION THEREOF

The present invention relates to new synthetic penicillins useful as antibacterial agents, nutritional supplements in animal feeds, and therapeutic agents in animals including human being and poultry. More particularly, the present invention relates to novel penicillin compounds shown by the general formula (I):

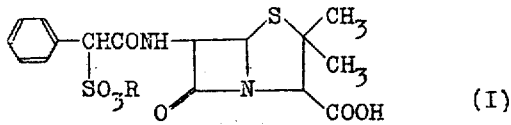

(wherein R is a straight chain alkyl group of not less than 7 carbon atoms) and its pharmaceutically acceptable salt.

Hitherto, many types of penicillin have been synthesized by N-acylating 6-aminopencillanic acid or its salt with various carboxylic acids or reactive derivatives thereof, but most of those known penicillin compounds suffer from at least one or more of the following drawbacks: (1) being not effective against Gram-negative bacteria, (2) being ineffective against so-called penicillin G-resistant strains of bacteria (e.g. many strains of *Staphylococcus aureus*) and (3) showing substantially no antimicrobial activity against microorganisms belonging to the genus Pseudomonas.

Among those known penicillins, α-sulfobenzylpenicillin is unique in that the penicillin is free from the above mentioned shortcomings. That is to say, the α-sulfobenzylpenicillin shows quite a strong antimicrobial activity against Gram-positive bacteria, Gram-negative bacteria including the genus Pseudomonas and penicillin G-resistant strains of bacteria. But it has recently been found that the penicillin does not give sufficiently high blood concentration when orally administered to hosts including man.

The present inventors have succeeded in synthesizing the novel penicillin compounds of the general formula (I) as well as their pharmaceutically acceptable salts and have unexpectedly found that when orally administered to a host, those novel penicillins are far more easily absorbed in blood and tissues from the gastrointestinal tract as compared with α-sulfobenzylpenicillin, i.e. the abortion ratio of those penicillins is far higher than that of α-sulfobenzylpenicillin; that those penicillins in blood and tissues are immediately converted to α-sulfobenzylpenicillin; and that the conversion gives high blood concentration of α-sulfobenzylpenicillin.

They have also found that the penicillin compounds (I) as well as their salts of the present invention have very low toxicity to animals including mammals.

Therefore, it is the main object of the present invention to provide novel penicillins which are highly efficiently absorbed through oral administration.

Another object of the present invention is to provide novel penicillins showing excellent antimicrobial activity against Gram-positive and Gram-negative bacteria.

Another object of the present invention is to provide novel penicillins having quite strong antibacterial activity against the microorganism of the genus Pseudomonas and effective against the Pseudomonas infections.

Another object of the present invention is to provide an industrially feasible method for the production of thus useful penicillins.

A further object of the present invention is to provide a pharmaceutical composition for the antibacterial treatment which comprises as an active ingredient the penicillin compound (I) or its pharmaceutically acceptable salt and which is particularly effective against the Pseudomonas infections.

Further objects of the invention as well as advantages and features thereof will be apparent from the following description of the invention.

Referring to the general formula (I), the alkyl group designated by symbol R is a straight alkyl group of not less than 7 carbon atoms, examples of which include heptyl, octyl, nonyl; decyl groups(alkyl groups of from 10 to 19 carbon atoms) such as decyl, undecyl, dodecyl, tetradecyl, pentadecyl, heptadecyl, hexadecyl, octadecyl, nonadecyl, tridecyl, etc.; and cosyl groups (alkyl groups of from 20 to 29 carbon atoms) such as eicosyl, dosocyl, tetracosyl, octacosyl and the like. From the view point of a low production cost, a straight alkyl group of 7 to 22 carbon atoms is preferred and a straight alkyl group of 8 to 14 carbon atoms is most preferable.

The pharmaceutically acceptable salts of the objective compound include salts with bases such as non-toxic metals, particularly alkali metals, (e.g. sodium, potassium, calcium, aluminum, magnesium, etc.) or amines, particularly organic amines, (e.g. ammonia, triethylamine, diethanolamine, dibenzylamine or other amines which have been used for various known penicillins).

The penicillin compound of the general formula (I) or its pharmaceutically acceptable salt is produced by a method which comprises reacting 6-aminopencillanic acid, its salt or its easily cleavable ester with a carboxylic acid shown by the general formula (II):

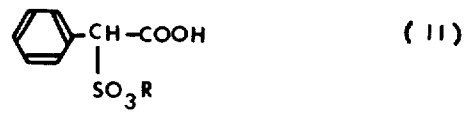

(wherein R has the same meaning as defined above) or a reactive derivative thereof.

The starting compound of the general formula (II) is a novel compound and can be prepared by, for example reacting a mono-metal salt of α-sulfophenylacetic acid (e.g. the salt of potassium, sodium or silver) with the corresponding alkyl halide (e.g. iodide).

The reaction is ordinarily conducted in an inert solvent such as benzene, chloroform, carbon tetrachloride, ethyl acetate, dichloromethane, dichloroethane, n-hexane or the like. While the reaction is generally carried out at room temperature (about 15°C to 35°C), it may be conducted under heating for example at a temperature in a range from about 50°C to about 80°C or under cooling at about −10°C to about 15°C.

It has hitherto been well known among those skilled in the field of the penicillin syntheses that various penicillin compounds can be produced by N-acylating 6-aminopenicillanic acid, its salt or its easily cleavable ester with a carboxylic acid or its reactive derivative. The reaction of the present invention may be conducted in accordance with the known N-acylation reaction and techniques therefor.

The salt of 6-aminopenicillanic acid includes a metal salt (e.g. sodium salt, calcium salt, aluminum salt) or an organic amine salt (e.g. triethylamine salt). The easily cleavable ester of 6-aminopenicillanic acid is exemplified by the silyl ester (e.g. trimethylsilyl ester, trimethoxysilyl ester) of 6-aminopencillanic acid, the silenated ester of 6-aminopenicillanic acid, the alkyltin ester (e.g. tri-n-butyltin ester) of 6-aminopenicillanic acid, the alkylsulfonylalkyl ester(e.g. β-methylsulfonylethyl ester, β-ethylsulfonylethyl ester), the acyloxyalkyl ester (e.g. pivaroyloxymethyl ester, acetoxymethyl ester, propionyloxyethyl ester, butyloyloxymethyl ester or benzoyloxymethyl ester) and the substituted or unsubstituted phenylalkyl ester (e.g. triphenylmethyl ester). The silyl ester may be mono- or di-ester. The silyl derivative of 6-aminopenicillanic acid is prepared by reacting 6-aminopenicillanic acid with a monofunctional silicone derivative such as trimethylmonochloro silane, trimethoxymonochloro silane or the like in an inert solvent such as chloroform, toluene, benzene, ethyl acetate, or the like preferably in the presence of a base such as triethylamine or the like; the sileneted derivative of 6-aminopenicillanic acid is prepared by reacting 6-aminopenicillanic acid with a difunctional silicone derivative such as dimethyldichlorosilane, dimethoxydichlorosilane or the like in the presence of the base and in the inert solvent; the tin ester of 6-aminopenicillanic acid is produced by reacting 6-aminopenicillanic acid with, for example, tri-n-butyltinoxide; and other easily cleavable esters of 6-aminopenicillanic acid are produced by the known methods.

In the method of the present invention any of those known easily cleavable esters are conveniently employed.

The salt or reactive derivative of the compound shown by the general formula (II) can be prepared from the compound (II) by per se known means which have been well established in the field of the penicillin synthesis of peptides synthesis. Thus preferably salt of the compound (II) is exemplified by an inorganic salt (e.g. sodium salt, potassium salt, calcium salt) or an amine salt (e.g. triethylamine salt, pyridine salt), and the reactive derivative of the compound (II) is exemplified by the corresponding carboxylic acid halide (e.g. chloride), anhydride, mixed anhydride (for example with ethyl chlorocarbonate), activated ester and the like. When the compound (II) in the free form or the salt of the compound (II) is used for the N-acylation reaction, it is preferable to use a suitable condensing agent, examples of which include an N,N'-di-substituted carbodiimide such as N,N'-dichclohexylcarbodiimide; azolide such as N,N'-carbonylimidazole, N,N'-thionyldiimidazole, etc.; and such a dehydrating agent as N-ethoxycarbonyl-2-ethoxy-1,2-dihydroquinoline, phosphorus oxychloride, alkoxy acetylene, etc. In these instances of using condensing agents it is likely that the reaction proceeds via the formation of a reactive carboxylic acid derivative.

Ordinarily, this reaction can be conducted in a solvent with advantage and smoothly. The solvent may be any that is not detrimental to the present reaction, thus being exemplified by water and organic solvents such as acetone, tetrahydrofuran, dioxane, acetonitrile, chloroform, dichloromethane, dichloroethane, pyridine, dimethylaniline, dimethylformamide, dimethylacetamide, dimethylsulfoxide, ethyl acetate, dioxane, benzene, tetrahydrofuran, etc. as well as their mixtures.

The decomposition of the reaction product in the reaction medium is slow particularly at pH 2 to 7, and it is preferable for a better yield that the reaction is carried out in the above organic solvent.

When the N-acylation reaction is carried out by the reaction between the carboxylic acid (II) and 6-aminopenicillanic acid in the presence of a condensing agent, an organic solvent such as dimethyl foramide, chloroform, acetone, methylene chloride, methyl isobutyl ketone, dioxane, ethyl acetate or the like is preferred.

When acid halide of the carboxylic acid (II) is employed as the reactive derivative of the carboxylic acid (II), the N-acylation reaction is preferably carried out in the presence of a tertiary amine (e.g. triethylamine, pyridine, quinoline, isoquinoline, N,N-dimethylaniline or the like) or an alkali (e.g. an alkali metal carbonate, an alkali metal hydroxide, an alkali metal bicarbonate, etc.). When the easily cleavable ester of 6-aminopenicillanic acid is employed, the N-acylation reaction is carried out in an inert solvent such as chloroform, methylene chloride, benzene, toluene or the like.

The reaction temperature is largely optional, but the product penicillin tends to decompose slowly at a temperature above 50°C. The reaction is usually at a temperature of not more than 50°C. For better yield, the reaction is carried out at room temperature (about 10°C to about 35°C) or at a temperature below room temperature, for example, at a temperature in a range about −10°C to about 10°C.

When the easily cleavable ester of 6-aminopenicillanic acid is employed for the reaction, it is to be noted that the easily cleavable ester residue should be removed in accordance with the per se known means at any time after the reaction. For example, when the silyl ester or the silenated ester of 6-aminopenicillanic acid is employed, the silyl or silenated ester residue is removed by the mere contact of the reaction product with an alcohol (e.g. methanol, ethanol) or water to give the desired product.

The objective compound of the present invention can then be recovered from the reaction mixture in a state of high purity in accordance with per se known means (e.g. extraction, concentration, lyophilization or the like). Usually the objective compound of the present invention can be recovered from the reaction mixture in which it exists either as the free acid or salt thereof. If desired, the salts may be converted into free penicillin or to other pharmaceutically acceptable salts by conventional processes, and free penicillin may be converted to the pharmaceutically acceptable salt in accordance with per se known means.

Further, depending upon necessities, these compounds can be further purified by such procedures as column chromatography, isoelectric precipitation, countercurrent distribution, recrystallization and the like.

In the objective penicillins of the present invention, the α-carbon atom of the acyl group constitutes an asymmetric carbon atom and there exists two optical isomers. It is to be understood that all such isomeric forms as well as mixtures thereof are included in the scope of the present invention. When the acylation product is obtained as a mixture of isomers, if desired the mixture may be resolved optically into respective isomers for example by chromatography according to per se known procedures. Alternatively, the optically active penicillins are produced by employing an optically active carboxylic acid of the general formula (II) or its reactive derivative derived from the carboxylic acid (II).

The penicillin compound obtainable by the process of this invention can be administered, either as such or after compounding it with pharmaceutical excipients or carriers, in such dosage forms as powders, granules, tablets, capsules, suppositories, injections and so on. The recommended dosage for an adult human is 0.1 to 1 gram in terms of amounts of α-sulfobenzylpenicillin every 1 to several hours.

The pharmaceutical compositions such as powders, granules, tablets, capsules, suppositories can be prepared in accordance with per se known means, for example, by admixing the penicillin of the present invention with the known pharmaceutical excipients or carriers.

The following Examples are illustrative embodiments of the present invention, and in those Examples the "part(s) by weight" have the same relationship to the "part(s) by volume" as do "gram(s)" to "milliliter(s)".

Preparation of Starting Materials 32.3 parts by weight of α-sulfophenylacetic acid monosilver salt is suspended in 300 parts by volume of ethyl acetate, followed by the addition of 30 parts by weight of dodecyl iodide. The mixture is refluxed for 12 hours. After cooling, the mixture is filtered under reduced pressure. 100 parts by volume of water is added to the filtrate, and the mixture is adjusted to pH 7 with a 10 % aqueous solution of sodium hydroxide. The mixture is well stirred, and the organic layer is removed. To the aqueous layer is added 200 parts by volume of ethyl acetate, followed by adjusting to pH 2 with a 10 % hydrochloric acid. The aqueous layer is separated, and the ethyl acetate layer is concentrated to dryness to obtain 17 parts by weight of α-dodecylsulfophenylacetic acid as white powders.

IR $\nu_{max}^{KBr}$ cm$^{-1}$: 2925, 2850(—CH—), 1712(—COOH), 1498(phenyl), 1362, 1170(—SO$_3$—).
NMR(CDCl$_3$) 60Mc, ppm:7.30 to 7.70 (5H, m), 5.15(1H, s), 4.1(2H, t), 1.10 to 1.80(20H, m), 0.86(3H, t).

By the similar manner to the above method, the following compounds are produced.

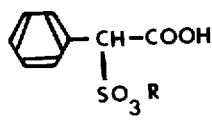

1.
R=C$_7$H$_{15}$
IR $\nu_{max}^{KBr}$ cm$^{-1}$: 2930, 2850(—CH—), 1710(—COOH), 1496(phenyl), 1360, 1165(—SO$_3$—).
NMR(CDCl$_3$) 60Mc ppm:7.30 to 7.75(5H, m), 5.20(1H, s), 4.12(2H, t), 1.05 to 1.85(8H, m), 0.85(3H, t).

2.
R=C$_8$H$_{17}$
IR $\nu_{max}^{KBr}$ cm$^{-1}$: 2940, 2870(—CH—), 1710(—COOH), 1500(phenyl), 1365, 1172(—SO$_3$—).

NMR(CDCl$_3$) 60Mc ppm: 7.27 to 7.77(5H, m),5.20(1H, s), 4.10(2H, t),1.05 to 1.87(12H, m), 10.89(3H, t).

3.
R=C$_{10}$H$_{21}$
IR $\nu_{max}^{KBR}$ cm$^{-1}$: 2930, 2850(—CH—), 1710(—COOH), 1500(phenyl), 1360, 1170(—SO$_3$—).
NMR(CDCl$_3$) 60Mc ppm:7.30 to 7.70(5H, m), 5.18(1H, s), 4.10(2H, t),1.05 to 1.8(16H, m), 0.87(3H, t).

4.
R=C$_{14}$H$_{29}$
IR $\nu_{max}^{KBr}$ cm$^{-1}$: 2930, 2850(—CH—), 1712(—COOH), 1500(phenyl), 1360, 1168(—SO$_3$—).
NMR(CDCl$_3$) 60Mc ppm: 7.31 to 7.71(5H, m), 5.19(1H, s), 4.09(2H, t), 1.06 to 1.86(24H, m), 0.88(3H, t).

5.
R=C$_{16}$H$_{33}$
IR $\nu_{max}^{KBr}$ cm$^{-1}$: 2920, 2850(—CH—), 1710(—COOH), 1496(phenyl), 1360, 1168(—SO$_3$—).
NMR(CDCl$_3$) 60Mc ppm: 7.21 to 7.71(5H, m), 5.08 (1H, s), 4.08(2H, t), 1.08 to 1.81 (28H, m), 0.86(3H, t).

6.
R=C$_{18}$H$_{37}$
IR $\nu_{max}^{KBr}$ cm$^{-1}$: 2930, 2920(—CH—), 1712(—COOH), 1500(phenyl), 1363, 1170(—SO$_3$—).
NMR(CDCL$_3$) 60Mc ppm: 7.35 to 7.80(5H, m), 5.20(1H, s), 4.12(2H, t), 1.05 to 1.8(32H, m), 0.90(3H, t).

7.
R=C$_{20}$H$_{41}$
IR $\nu_{max}^{KBr}$ cm$^{-1}$: 2930, 2920(—CH—), 1712(—COOH), 1500(phenyl), 1363, 1170(—SO$_3$—).
NMR(CDCL$_3$) 60Mc ppm:7.30 to 7.60(5H, m), 5.18(1H, s), 4.12(2H, t),1.10 to 1.70(36H, m), 0.9(3H, t).

8.
R=C$_{22}$H$_{45}$
IR $\nu_{max}^{KBr}$ cm$^{-1}$: 2940, 2860(—CH—), 1715(—COOH), 1500(phenyl), 1365, 1170(—SO$_3$—).
NMR(CDCl$_3$) 60Mc ppm: 7.25 to 7.80(5H, m), 5.13 (1H, s), 4.09(2H, t), 1.05 to 1.90 (40H, m), 0.89(3H, t).

EXAMPLE 1

α-Octadecylsulfobenzylpenicillin soidum a. In 8 parts by volume of ether is dissolved 2.34 parts by weight of α-octadecylsulfophenylacetic acid, followed by the addition of 8 parts by volume thionyl chloride and 0.1 part by weight dimethylformamide. The mixture is allowed to react at room temperature for 2 hours, at the end of which time it is concentrated to dryness under reduced pressure. The Procedure yields 2.6 parts by weight of α-octadecylsulfophenylacetyl chloride as a light-yellowish powder.

b. In a mixture of 10 parts by volume chloroform and 1.0 part by weight hexamethyldisilazane there is suspended 1.08 parts by weight of 6-aminopenicillanic acid and the suspension is reacted under reflux for 1 hour. The reaction mixture is concentrated to dryness under reduced pressure and, then, 30 parts by volume of dichloromethane is added. After cooling with ice, 0.5 part by weight of triethylamine is added. Then, the acid chloride prepared above in (a) is added and, under stirring, the mixture is reacted for 1 hour. To the reaction mixture is added 10 parts by volume of water and, after stirring, the mixture is adjusted to pH 1.0 with 1N-hydrochloric acid. The organic layer is recovered, admixed with 10 parts by volume of water and brought to pH 6.8 with 1N-sodium hydroxide. The water layer is recovered and concentrated to dryness, whereupon 2.56 parts by weight of the desired sodium salt is obtained as powders. The IR and NMR spectra of this product are as follows.

IR $\nu_{max}^{KBr}$ cm$^{-1}$: 1770($\beta$-lactam), 1680(—CONH—), 1610(—COO$^-$), 1365, 1170, 940(—SO$_3$—), 2900(—CH—).

NMR[(CD$_3$)$_2$SO], 60Mc, ppm:
7.50(5H, s), 5.90(1H, d), 5.45(2H, d), 4.10(3H, m), 1.50(6H, t), 1.35(ca.30H, m+s), 0.88(3H, t).

Blood concentration of the product

The above product or $\alpha$-sulfobenzylpenicillin is orally administered to three guinear pigs, the amount of each penicillin per each guinear pig being 6.55×10$^{-4}$ mol/kg. After certain hour(s) from the administration, the blood concentrations of those penicillins are determined by the use of *Pseudomonas aeruginosa* NCTC 10490.

| | Blood concentrations (microgram(s)/milliliter) | | | |
|---|---|---|---|---|
| Hour(s) | 0.5 | 1 | 2 | 3 |
| The product of Example 1 | 6.1 | 18.2 | 16.1 | 10.7 |
| $\alpha$-sulfobenzyl-penicillin | <0.6 | <0.6 | <0.6 | <0.6 |

EXAMPLE 2

$\alpha$-Decylsulfobenzylpenicillin sodium

In a mixture of 20 parts by volume chloroform and 2.0 parts by weight hexamethyldisilazane is suspended 2.16 parts by weight of 6-aminopenicillanic acid. The suspension is refluxed for 1 hour, at the end of which time it is concentrated to dryness under reduced pressure. Then, 50 parts by volume of dichloromethane is added and, after cooling with ice, 1.0 part by weight of triethylamine is added, further followed by the addition of 3.5 parts by weight of $\alpha$-decylsulfophenylacetyl chloride which has been prepared by reacting $\alpha$-decylsulfo-phenylacetic acid with thionyl chloride in the same manner as Example (1a).

The mixture is allowed to react for 1 hour, at the end of which time 15 parts by volume of water is added. After stirring, the mixture is adjusted to pH 1.0 with 1N-hydrochloric acid. The organic layer is separated and 10 parts by volume of water is added. It is then adjusted to pH 6.8 with 1N-sodium hydroxide. The water layer is separated and concentrated to dryness, whereupon 2.80 parts by weight of the desired sodium salt is obtained as powdery crystals.

The IR and NMR spectra of this product are:
KR $\nu_{max}^{KBr}$ cm$^{-1}$: 1775($\beta$-lactam), 1685(—CONH—), 1615(—COO$^-$), 1360, 1170, 935(—SO$_3$—), 2950(—CH—).

NMR(D$_2$O),60Mc, ppm: 7.50(5H, s), 5.65(3H, m), 4.25(3H, m), 1.55-1.15
(ca. 18H, m), 0.80(3H, t).

EXAMPLE 3

$\alpha$-Hexadecylsulfobenzylpenicillin sodium

In 10 parts by volume of water is suspended 2.16 parts by weight of 6-aminopenicillanic acid, which is then dissolved by the addition of 10 parts by volume of 1N-sodium hydroxide. After 1.0 part by weight of sodium hydrogen carbonate is added, the solution is cooled with ice and a solution of 4.8 parts by weight $\alpha$-hexadecylsulfophenylacetyl chloride in 20 parts by volume of ether is added dropwise over 10 minutes.

Then, at the same temperature, the mixture is reacted under stirring for half an hour. After the reaction mixture is brought to pH 1.0 with 1N-hydrochloric acid, the water layer is separated and 50 parts by volume of ethyl acetate is added. Under cooling with ice, it is adjusted to pH 2.0 with 1N-hydrochloric acid and the organic layer is separated and 20 parts by volume of water is added. It is then brought to pH 6.8 with 1N-sodium hydroxide. The water layer is separated and concentrated to dryness under reduced pressure. The above procedure yields 2.8 parts by weight of the desired sodium salt as powders.

The IR and NMR spectra of this product are:
IR $\nu_{max}^{KBr}$ cm$^{-1}$: 1770($\beta$-lactam), 1685(—CONH—), 1610(—COO$^-$), 1365, 1170, 940(—SO$_3$—), 2900(—CH—).

NMR[(CD$_3$)$_2$SO], 60Mc, ppm: 7.50(5H, s), 5.85(1H, d), 5.45(2H, d), 4.10(3H, m), 1.50(6H, t), 1.35(ca. 25H, m+s), 0.90(3H, t).

EXAMPLE 4

$\alpha$-Dodecylsulfobenzylpenicillin sodium

By a procedure similar to that described in Example 1, 1.92 parts by weight of $\alpha$-dodecylsulfophenylacetic acid is condensed with 1.08 parts by weight of 6-aminopenicillanic acid. The procedure yields 2.01 parts by weight of the desired sodium salt as powders.

The IR and NMR spectra of this product are:
IR $\nu_{max}^{KBr}$ cm$^{-1}$: 1772($\beta$-lactam), 1685(—CONH-), 1613(—COO$^-$), 1370, 1180, 940(—SO$_3$—), 2950(—CH —).

NMR[(CD$_3$)$_2$SO ], 60 Mc, ppm: 7.50(5H, broad), 5.85(1H, d), 5.45(2H, d), 4.10(3H, m), 1.50(6H, t), 1.30(ca. 20H, m), 0.90(3H, t).

EXAMPLE 5

$\alpha$-octylsulfobenzylpenicillin sodium

In 40 parts by volume of dichloromethane is suspended 4.3 parts by weight of 6-aminopenicillanic acid, which is then dissolved by the addition of 7.1 parts by weight of triethylamine. Then, 4.3 parts by weight of trimethylchlorosilane is added and the mixture is refluxed under stirring for 60 minutes. After cooling with ice, a solution of 6.5 parts by weight $\alpha$-octylsulfo-phenylacetyl chloride in 30 parts by volume dichloromethane is added dropwise over 30 minutes. Then, at the same temperature, the mixture is allowed to react under stirring for 1 hour. The resultant reaction mixture is treated by a procedure similar to that described in Example 2, whereupon 6.1 parts by weight of the desired sodium salt is obtained as powders. The IR and NMR spectra of this product are as follows.

IR $\nu_{max}^{KBr}$ cm$^{-1}$ : 1770($\beta$-lactam), 1685(—CONH-), 1615(—COO$^-$), 1360, 1165, 925(—SO$_3$—), 2900(—CH—).

NMR[(CD$_3$)$_2$SO], 60Mc, ppm: 7.45(5H, s), 5.92(1H, s), 5.45(2H, s), 4.20(2H, t), 3.91(1H, s), 1.50(5H, t), 1.35(ca. 10H, m).

EXAMPLE 6

α-Tetradecylsulfobenzylpenicillin sodium

By a procedure similar to that described in Example 5, 9.0 parts by weight of α-tetradecylsulfophenylacetyl chloride is condensed with 4.3 parts by weight of 6-aminopenicillanic acid. The procedure yields 8.52 parts by weight of the desired sodium salt as powders. The IR spectrum of this compound is as follows.

IR $\nu_{max}^{KBr}$ cm$^{-1}$: 1770(β-lactam), 1685(—CONH—), 1610(—COO$^-$), 1370, 1170, 940(—SO$_3$—), 2950(—CH—).

EXAMPLE 7

α-Docosylsulfobenzylpenicillin sodium

By a procedure similar to that described in Example 1, 5.3 parts by weight of α-docosylsulfophenylacetic acid is condensed with 2.16 parts by weight of 6-aminopenicillanic acid. The procedure yields 5.5 parts by weight of the desired sodium salt powders. The IR and NMR spectra of this product is as follows.

IR $\nu_{max}^{KBr}$ cm$^{-1}$: 1770(β-lactam), 1680(—CONH—), 1608(—COO$^-$), 1362, 1165, 945(—SO$_3$—), 2900(—CH—).

NMR[(CD$_3$)$_2$SO], 60Mc, ppm: 7.40(5H, s), 5.80(1H, s), 5.39(2H, m), 4.15(2H, t), 3.88(1H, s), 1.50(6H, t), 1.23(ca.40H, s), 0.85 (3H, t).

In the similar manner to the Example 7, α-eicosylsulfobenzylpenicillin sodium is produced.

IR $\nu_{max}^{KBR}$ cm$^{-1}$: 1770(β-lactam), 1675(—CONH—), 1610(—COO$^-$), 1360, 1770, 940(—SO$_3$—), 2930(—CH—).

NMR[(CD$_3$)$_2$SO], 60Mc, ppm:
7.40(5H, s), 5.87(1H, s), 5.46(2H, m), 4.16(2H, t), 3.99(1H, s), 1.50(6H, t), 1.29(ca. 36H, s), 0.88 (3H, t).

EXAMPLE 8

α-Heptylsulfobenzylpenicillin sodium 2.16 Parts by volume of 6-aminopenicillanic acid is suspended in a mixture of 7 parts by volume of chloroform and 2.0 parts by weight of hexamethyldisilazane. The mixture is refluxed for an hour and concentrated to dryness under a reduced pressure. To the residue is added 50 parts by volume of dichloromethane, and the mixture is cooled with ice, followed by the addition of 1.0 part by weight of triethylamine. To the mixture is dropwise added 3.2 parts by weight of α-heptylsulfophenylacetyl chloride dissolved in 15 parts by volume of dichloromethane, the addition taking 30 minutes. The mixture is further stirred under cooling. The mixture is subjected to the same recovery means as in Example 2 to obtain 2.9 parts by weight of α-heptylsufobenzylpenicillin sodium. The IR and NMR spectra of the product are as follows.

IR $\nu_{max}^{KBr}$ cm$^{-1}$: 1770(β-lactam), 1680(—CONH—), 1615(—COO$^-$), 1360, 1170, 938(—SO$_3$—), 2930(—CH—).

NMR[(cd$_3$)$_2$SO), 60Mc ppm: 7.40(5H, s), 588(1H, s), 5.47(2H, m), 4.18(2H, t), 3.90(1H, s), 1.55(6H, t), 1.25(9H, s), 0.90(3H, t).

Reference Example

The penicillin compounds of the present invention and α-sulfobenzylpenicillin are orally administered to male guinea pigs, the guinea pig weighing 500±50 g. and the amount of the compound to one guinea pig being 1.09 × 10$^{-4}$ mol. The urine which is excreted by the guinea pigs for 15 hours from the time of administration is pooled, and the urinary recovery ratio of the penicillins in the form of α-sulfobenzylpenicillin are determined by the use of *Pseudomonas aeruginosa* NCTC 10490.

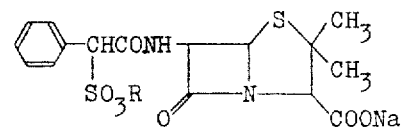

| R | Number of guinea pigs employed in the test | Urinary Recovery ratio (%) |
|---|---|---|
| $C_8H_{17}$ | 14 | 5.8 |
| $C_{10}H_{21}$ | 16 | 7.8 |
| $C_{12}H_{25}$ | 14 | 5.0 |
| $C_{14}H_{29}$ | 6 | 5.6 |
| $C_{16}H_{33}$ | 7 | 3.1 |
| $C_{18}H_{37}$ | 6 | 2.7 |
| Na | 9 | 0.61 |

What is claimed is:

1. A penicillin compound selected from the group consisting of compounds of the formula

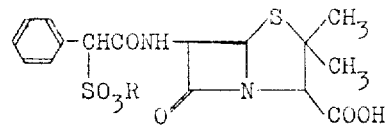

wherein R is a straight chain alkyl group of 7 to 22 carbon atoms, and pharmaceutically acceptable salts thereof.

2. A penicillin compound as claimed in claim 1 wherein R is a straight chain alkyl group of 8 to 14 carbon atoms.

3. A penicillin compound as claimed in claim 2 wherein R is $C_8H_{17}$.

4. A penicillin compound as claimed in claim 2 wherein R is $C_{10}H_{21}$.

5. A penicillin compound as claimed in claim 2 wherein R is $C_{12}H_{25}$.

6. A penicillin compound as claimed in claim 2 wherein R is $C_{14}H_{29}$.

* * * * *